(12) United States Patent
Benkofske et al.

(10) Patent No.: US 6,854,964 B1
(45) Date of Patent: Feb. 15, 2005

(54) APPARATUS FOR MOLDING A PLATE (75) Inventors: Neal A. Benkofske, Elk River, MN (US); Pat C. Bell, Adover, MN (US); Mike R. Strantz, Ramsey, MN (US); William H. Hassell, Andover, MN (US); Charles J. VanHeel, Rogers, MN (US); Gerald R. Harms, Elk River, MN (US)

(73) Assignee: Imperial Custom Molding, Inc., Rogers, MN (US)

( * ) Notice: Subject to any disclaimer, the term of this patent is extended or adjusted under 35 U.S.C. 154(b) by 303 days.

(21) Appl. No.: 09/655,134

(22) Filed: Sep. 5, 2000

(51) Int. Cl.[7] .......................... B29C 43/52; B29C 43/56
(52) U.S. Cl. ...................... 425/116; 425/125; 425/388; 425/395; 425/407
(58) Field of Search .......................... 425/116, 121, 425/125, 394, 395, 397, 407, 388; 264/294, 322, 325

(56) References Cited

U.S. PATENT DOCUMENTS

| | | | |
|---|---|---|---|
| 4,751,029 A | * 6/1988 | Swanson | 264/40.4 |
| 5,507,633 A | * 4/1996 | Osada et al. | 425/116 |
| 5,614,312 A | * 3/1997 | Tucker et al. | 428/323 |
| 5,820,801 A | * 10/1998 | Greve | 425/84 |
| 5,858,569 A | 1/1999 | Meacher et al. | 429/26 |
| 5,945,232 A | 8/1999 | Ernst et al. | 429/32 |
| 5,981,098 A | 11/1999 | Vitale | 429/34 |
| 6,015,633 A | 1/2000 | Carlstrom, Jr. et al. | 429/13 |
| 6,071,635 A | 6/2000 | Carlstrom, Jr. | 429/34 |

* cited by examiner

Primary Examiner—Benjamin L. Utech
Assistant Examiner—Thu Khanh T. Nguyen
(74) Attorney, Agent, or Firm—Schwegman, Lundberg, Woessner & Kluth, P.A.

(57) ABSTRACT

A method and apparatus for molding a plate having highly detailed surface features from a thermosetting resin with a high concentration of a filler such as graphite. The method an apparatus provides for the formation of a preform of casting material and the placement of the material in a cavity mold which is precisely temperature controlled, has vacuum assist operating throughout the molding operation. The molding pressure is rapidly increased to flow the material through the molding cavity prior to the onset of curing and uniquely positioned ejector pins are provided for removal of the molded plate without damage to the detailed surface features.

33 Claims, 9 Drawing Sheets

APPARATUS FOR MOLDING A PLATE

TECHNICAL FIELD

The technical field relates generally to a method and apparatus for compression molding a plate from a thermosetting resin mixture that has a filler concentration comprising at least 50%, by weight, of a conductive, relatively incompressible material. More particularly, it pertains to a method and apparatus for making plates from thermosetting resins using a high percentage of a conductive, relatively incompressible filler material such as graphite.

BACKGROUND

Molded parts formed from molding materials comprising thermosetting resins having a high filler concentration of at least 50% graphite by weight are difficult to manufacture using existing techniques. Such molding materials are difficult to mold because they do not flow evenly across the surfaces of a cavity mold as the mold is closed and additionally because they often begin to cure before the material has flowed across the entire surface of the mold.

Plates having a high concentration of graphite fillers may be used as anode plates in lithium batteries and also may find use as fluid flow plates in fuel cell assemblies where both their electrically conductive and thermally conductive properties are needed. It is difficult and expensive to machine graphite plates with the extensive details necessary for them to function as storage battery electrode plates or as fluid flow plates in fuel cell devices. Similarly, because of the difficulties in molding graphite filled materials using existing molding processes, it has not been practical to mold materials having a high graphite content.

Thus, what is needed are systems, devices, structures, and methods to overcome the difficulties of forming complex molded structures of materials having a graphite content of at least 50 to 80% by weight.

SUMMARY

The above-mentioned problems with the manufacture of graphite filled resin plates for battery, fuel cell and other applications are addressed by the present invention and will be understood by reading and studying the following specification. Systems, devices, structures, and methods are described which accord these benefits.

In one embodiment, the invention is a process for compression molding of a fine grained mixture of a resin and at least 50% filler material into a highly detailed molded part. The process involves forming, at a first pressure, a preform of resin and filler mixture in a predetermined weight sufficient for molding the molded part, the cross sectional area of the preform being substantially less than the area of the part to be molded and positioning the preform in a mold cavity at about the geometrical center of the product outline. The process also involves molding the preform into the molded part by compressing the preform between mold segments defining the mold cavity in a molding machine which closes and applies pressure to the halves of the mold cavity to apply a second pressure to the molded part within a time interval sufficient to fluidize and flow the material to all parts of the mold cavity prior to the onset of curing of the resin in the mold.

An embodiment of the invention may be a machine for molding a plate from a thermosetting preform material using a thermosetting compression molding process. Such a machine may have a first platen and mold cavity portion and a second platen and mold cavity portion. In the machine the first and second mold cavity portions constructed and arranged for receiving in a mold cavity thereof a preform comprising a thermosetting resin and at least about 50% by weight of a graphite filler material. Such a machine may have a press for performing a molding operation by rapidly forcing the first and second platen and mold cavity portions together in an interfitting relationship, thereby compressing the preform material into a molded part with features therein defined by the first and second cavity portions.

In another embodiment the invention is a mold assembly for use in a machine for molding a plate from a thermosetting preform material using a thermosetting compression molding process driven by a high pressure press. The mold assembly has a first platen and mold cavity portion and a second platen and mold cavity portion. In the mold assembly the first and second mold cavity portions are constructed and arranged for receiving in a mold cavity thereof a preform comprising a thermosetting resin and at least about 50% by weight of a graphite filler material. The first and second mold cavity portions of the assembly are constructed and arranged for performing a molding operation when the press rapidly forces the first and second platen and mold cavity portions together in an interfitting relationship and compressing the preform material into a molded part with features therein defined by the first and second cavity portions.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

In the following detailed description of the invention, reference is made to the accompanying drawings forming a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 1:
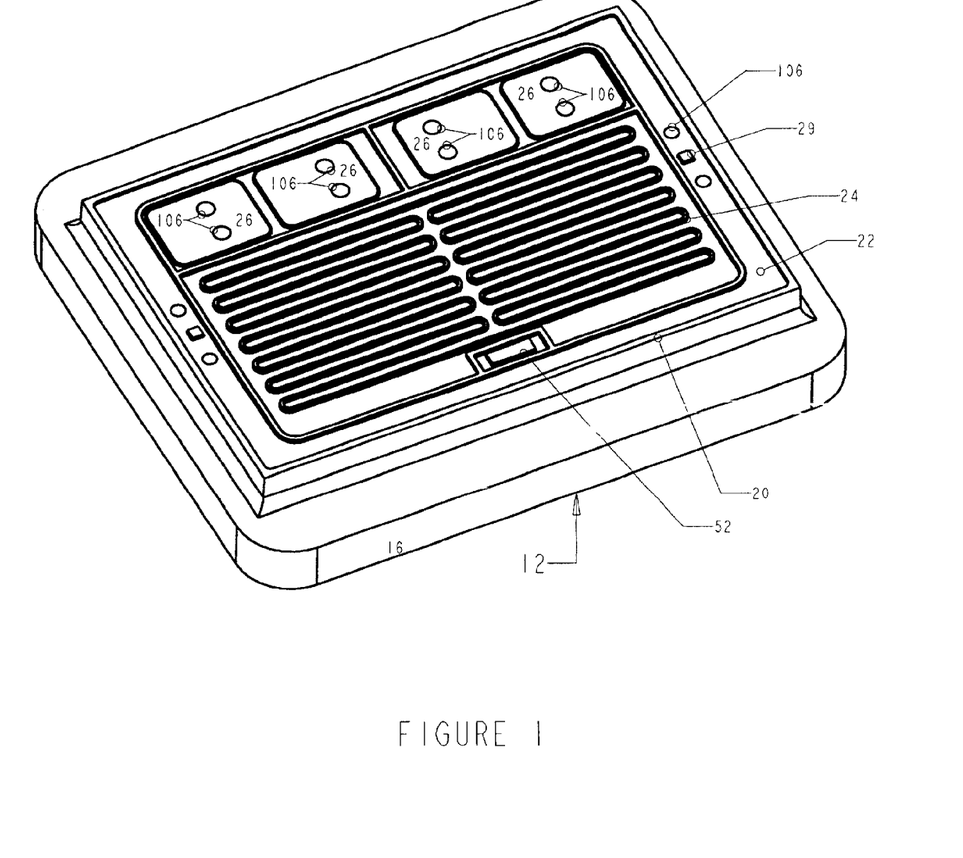
FIGS. 1 and 2 diagrammatically show a mold according to one embodiment of the present invention suitable for carrying out the method according to the invention.
Figure 2:
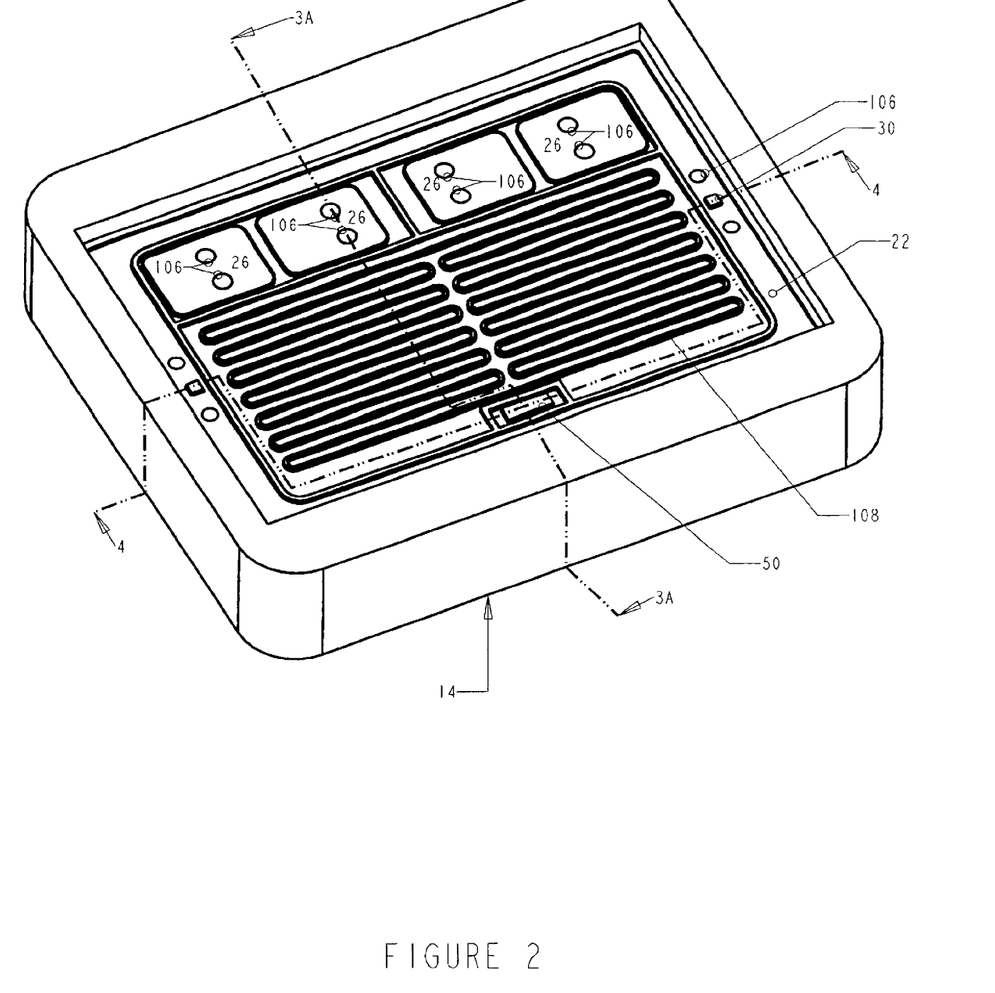

FIGS. 1 and 2 show, respectively, a male mold cavity portion 12 and a female mold cavity portion 14. In operation mold cavities 12 and 14, which are interfitting as described more fully below, are each mounted on a suitable platen and supporting structure in a suitable press in an abutting face to face relationship.

Figure 3A:
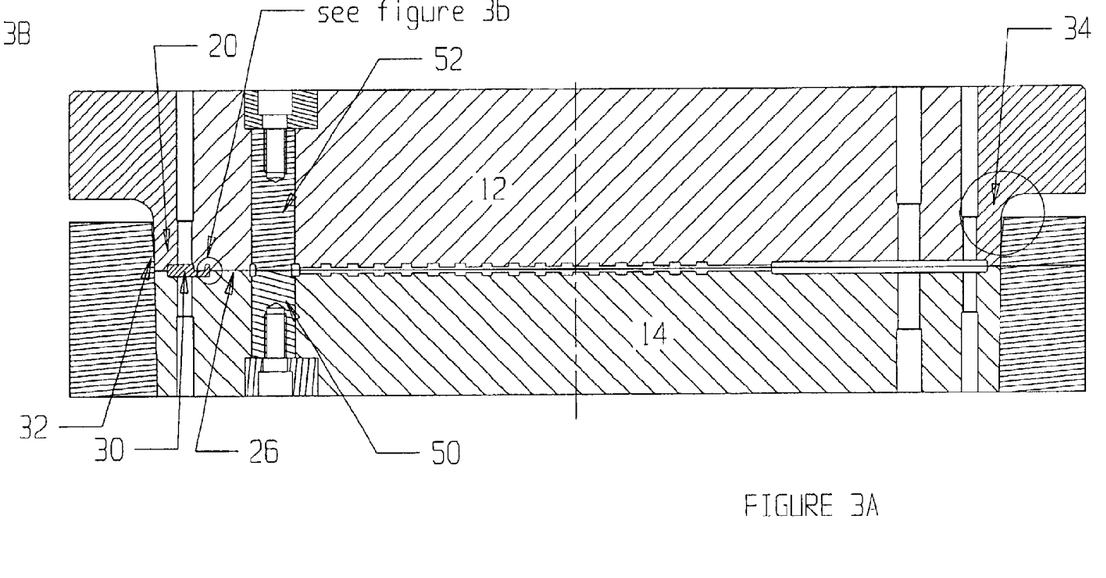
FIG. 3A is a cross section view of the cavity portions of the mold of FIGS. 1 and 2 taken along the lines 3A—3A of FIG. 2.
Figure 4:
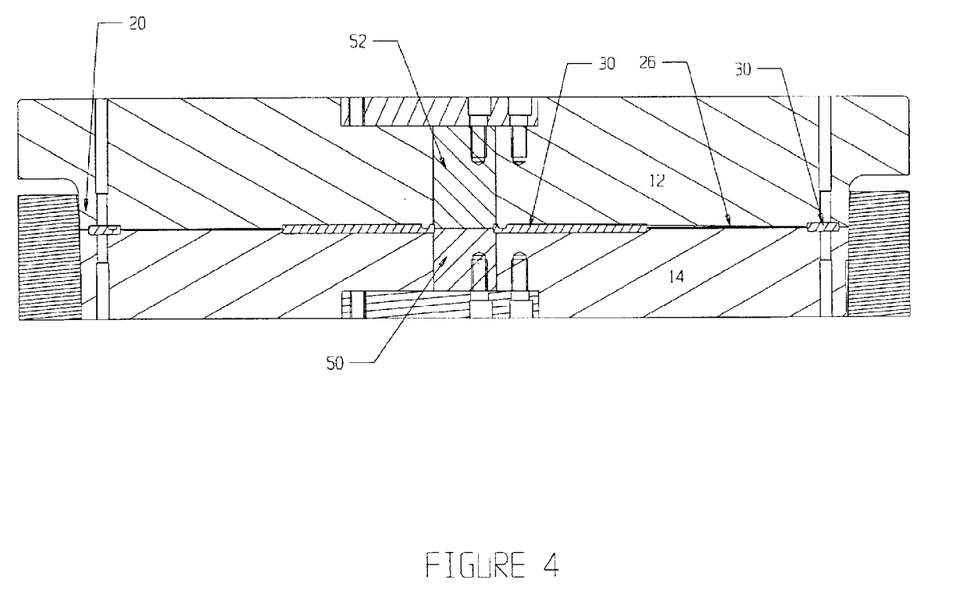
FIG. 4 is a cross section view of the cavity portion of the mold taken along the lines 4—4 of FIG. 2.

FIGS. 3A and 4 are sectional views of cavities 12 and 14 in a fully closed position as they would be in at the completion of a molding operation. The cross sectional view of FIG. 3A is taken along section lines 3A indicated in FIG. 2. The sectional view in FIG. 4 is taken along section lines 44 in FIG. 2.

As shown in FIG. 1, cavity portion 12 has a base portion 16 which provides support for the other mold cavity elements. Base portion 16 is manufactured from a tool steel such as H13 or any similar material. A peripheral edge 20 surrounds the actual mold area 22. In FIGS. 1 and 2 area 22 is illustrated in an embodiment for molding a complex plate which, in one embodiment, may be a battery plate or, in another embodiment, may be a fluid flow plate for a fuel cell. By battery plate, it will be appreciated, that we mean an electrode for use in a storage battery. By fluid flow plate it will be appreciated that we mean to describe fluid flow plates or collector plates which may serve one of a variety of functions in a fuel cell.

Various regions of the plates are shown in the mold area 22 of cavities 12 and 14. For example, in one embodiment, a fluid flow plate surface molded by cavity portion 12 might serve as a cathode plate and a plate surface molded by cavity 14 might serve as an anode plate. In such a configuration flow channels for carrying a fuel medium such as hydrogen or any hydrocarbon gas and humidification water may be formed in the molded plate by mold features 24. Such flow channels might also carry air/oxygen as oxidant, as well as humidification water and/or product water. The plates may have many different channel configurations which are not part of the present invention.

In addition to the flow channels that are molded into the plates by features 24, peripheral apertures are initially molded into the plate by forming very thin diaphragms 26 of material in what is to become the peripheral apertures. After the molding operation is complete, the diaphragms 26 can be readily punched out and any remaining flashing removed to complete the forming of the peripheral apertures 28. When fluid flow plates are combined in a fuel cell, a plurality of apertures 28 may combine to provide fluid manifolds for the fuel cell assembly.

In addition to the flow channels and peripheral apertures, mold cavities 12 and 14 also have further mold features 29 formed thereon for providing further apertures 28 on the fluid flow plates which may be used, for example, for alignment of the plates in a fuel cell assembly or for connecting the plates and directing fluid to and from the plates.

In FIGS. 3A and 4 a fluid flow plate 30 is shown between the halves 12 and 14 of the mold 10, which is illustrated in the closed position. It can be seen in these sectional views that a projecting flange or edge portion 20 of mold cavity portion 12 engages an inner peripheral groove 32 in the surface of cavity mold portion 14. Details of that interfiftting relationship are shown more clearly in FIG. 6 which is a detail of the region 34 of FIG. 3A. That interfitting relationship results in the provision of a fully positive shear edge which completely surrounds the mold cavity region.

Figure 6:
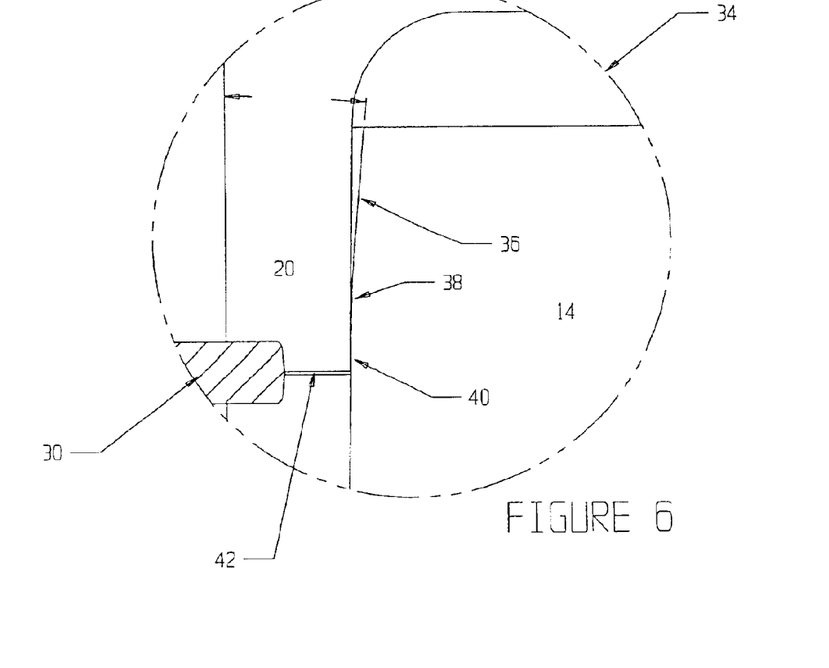
FIG. 6 is a detail view of a portion of the mold assembly of FIG. 5 showing the semi-positive land structure.

It can be seen in FIG. 6 that the upper portion 36 of wall 38 of the inner groove region 34 has a draft angle $\alpha$ which facilitates the mating of the two mold cavity portions 12 and 14 by providing a guide for peripheral flange 20 as the mold is forced into the closed position by the press. The draft angle $\alpha$ in one embodiment is about approximately 5 degrees.

The lower portion 40 of wall 38 is within about approximately 1 degree of perpendicular to parting line 42 of the mold so that there two mold portions 12 and 14 are maintained in their aligned relationship in the final stages of the molding operation. In one embodiment, the height of the substantially vertical portion 40 of wall 38 is about approximately 0.200 inches before the transition to the upper portion 36 of wall 38 which is angled at and angle of $\alpha$.

As shown in FIG. 6, the peripheral flange or edge 20 of mold cavity portion 12 does not contact mold cavity portion 14 along the parting line 42 when the cavity portions are fully closed. This is done so that a gap remains which is sufficient to receive the small amount of excess casting material which is forced out of the mold cavity as it is closed. That excess material may form a burr. Because the burr is so thin relative to the molded item 30, which in one embodiment may have a thickness at the edge of approximately about 0.15 inches, it can be readily removed. In one embodiment the separation of the parting lines of the two mold cavity portions is about approximately 0.007 inches. The semi-positive parting line feature described above has been found to be necessary in molding high filler content materials which are relatively incompressible in the mold as compared to the high resin content materials that have heretofore been considered suitable for thermoset compression molding operations.

Figure 3B:
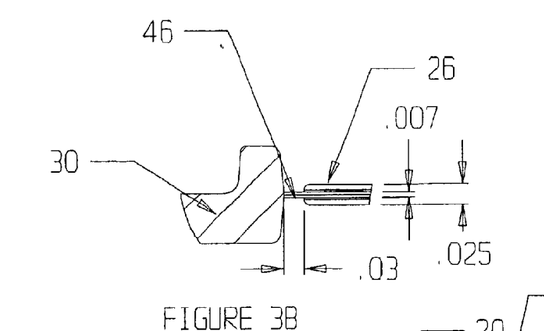
FIG. 3B is a detail view of a portion of the mold of FIG. 3A.

The same semi-positive parting line feature which is used around the perimeter of the molded parts is used to mold the diaphragms 26 as illustrated in the detail view 44 of FIG. 3A which forms FIG. 3B. In the detail of FIG. 3B the molded item 30 is shown with a thinned web region 46 formed by a split parting line between the two mold portions 14 and 16. The thinned web region 46 in one embodiment surrounds each of the diaphragms 26 and serves to facilitate the removal of the diaphragm prior to assembly of the plates 30 into a fuel cell assembly. Region 46 in one embodiment may have a thickness of about approximately 0.007 inches and a width of about approximately 0.3 inches. The remainder of diaphragm 26 in one embodiment has a thickness of about approximately at least 0.025 inches.

Mold cavity portions 12 and 14 as shown in FIGS. 1 and 2 in one embodiment may include detail molding inserts 50 and 52 which allow a single basic mold to be modified for producing several variants of a molded structure. In the sectional views of FIGS. 3A and 4, the installation of mold inserts 50 and 52 are also shown.

Figure 5:
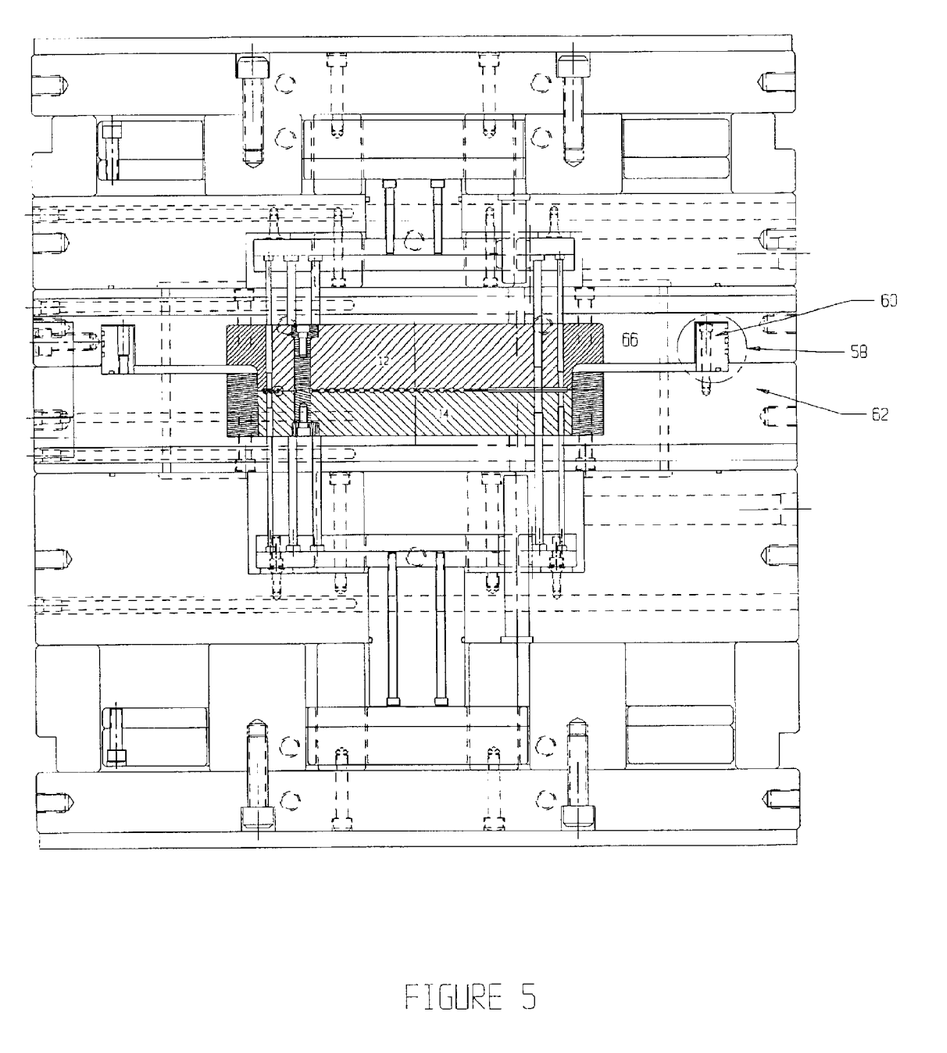
FIG. 5 is a sectional view of the mold of FIGS. 1 and 2 taken together with the additional structure of one embodiment of the mold assembly.

FIG. 5 is an elevation view of the cavity mold portions 12 and 14 and also shows aspects of platens which support them on the press. The region 34, which is shown in detail in FIG.

6, illustrates the positive shear edge joining of the mold cavities as well as the split parting line semipositive land features. A further detail 58, shown in FIG. 7, illustrates aspects of the implementation of the vacuum assist feature of one embodiment of the molding system.

Figure 7:
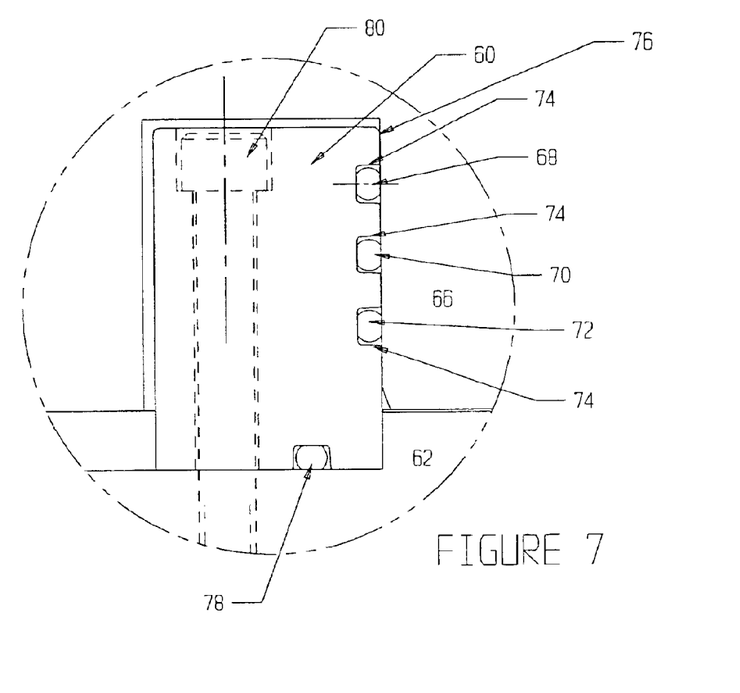
FIG. 7 is a detail view of a portion of FIG. 5 showing the structure of the vacuum seals.

In FIG. 7 the sealing aspects of the structure which allow for the provision of a vacuum assist in the molding process are shown. A sealing ring 60 is mounted on a platen 62 on which mold portion 14 is mounted. It circumferentially surrounds mold cavity portion 14, as may be in FIG. 10, a sectional view of the mold assembly.

Sealing ring 60 is, in turn, received in a corresponding circumferential slot 64 which is formed in platen 66. In order to provide an adequate seal for the evacuation of the mold cavity, sealing ring 60, in one embodiment, is provided with sealing o-rings 68, 70 and 72 which are seated in slots 74 in the outside vertical face 76 of sealing ring 60. In one embodiment, a further sealing oaring 78 is provided to seal sealing ring 60 against platen 62, to which it is mounted, in one embodiment by a bolt or other suitable fastener 80.

Figure 8:
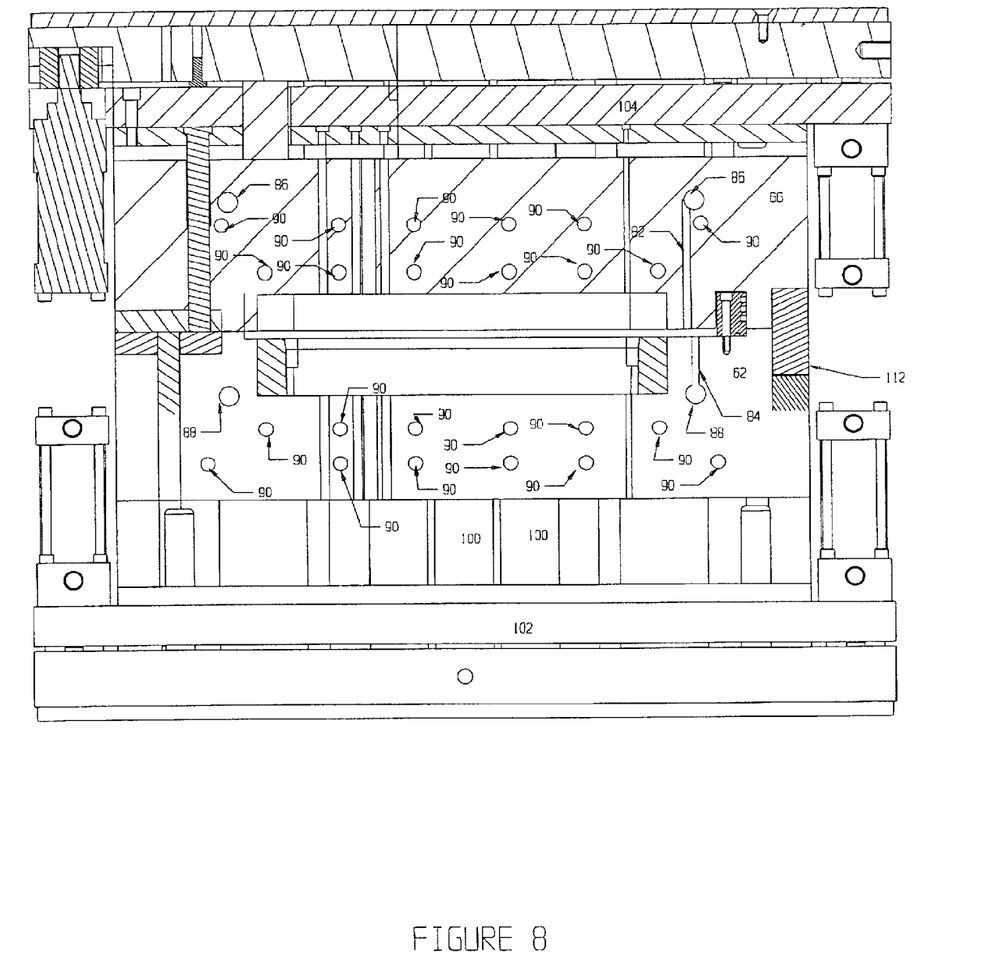
FIG. 8 is a sectional view of the mold assembly which shows the positioning of the heating cartridges and positioning of the vacuum ports.
Figure 9:
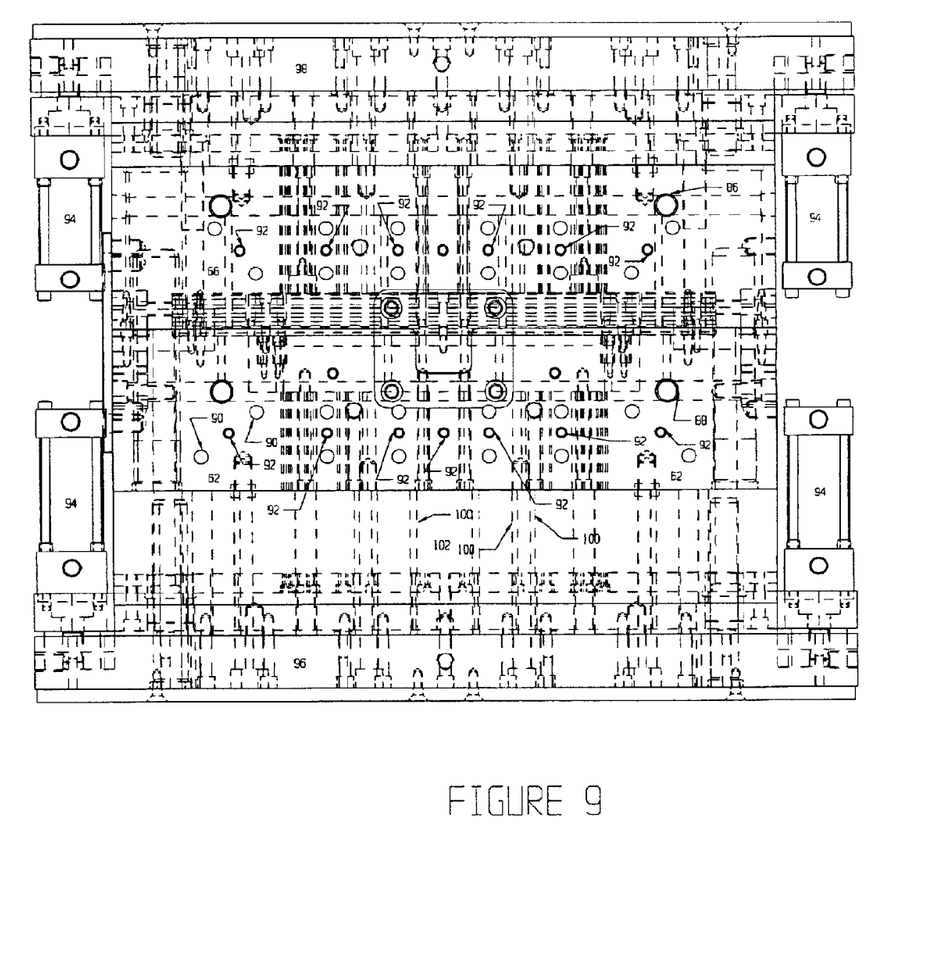
FIG. 9 is another sectional view of the mold assembly which shows the positioning of the thermal sensors relative to the heater cartridges.

A vacuum is drawn in the mold cavity after the mold portions 14 and 16 are moved into a closing position so that the o-rings 68, 70 and 72 of sealing ring 60 engage the surface of circumferential slot 76. Manifolds 82 and 84, as shown in the sectional view of FIG. 8, provide communication from the parting line of the closing mold through platens 66 and 62 respectively to vacuum ports 86 and 88 as shown in FIG. 9, an elevation view of the mold assembly. Ports 86 and 88 are in turn connected to a vacuum pump which is not shown. The entire molding operation is conducted under a vacuum which removes outgassing byproducts of the curing of the thermosetting resin, avoids the creation of high porosity regions in the molded product and by assisting the molten graphite resin mixture in spreading uniformly throughout the entirety of the mold cavity.

In order to accomplish the accurate molding of the molded items such as molded plates including battery plates or fluid flow plates for use in fuel cell assemblies, it is necessary to maintain the mold temperatures at a predetermined temperature throughout the molding process. This is accomplished in one embodiment by providing plates 62 and 66 with a plurality of 1800 watt cartridge heaters 90. Suitable cartridge heaters are available from D-M-E Company, 29111 Stephenson Highway, Madison Mich. 48071. In order to hold very tight temperature ranges during molding, a plurality of temperature sensors 92 are provided and embedded in platens 62 and 66 as shown in FIG. 8. In one embodiment temperature sensors 92 are thermocouple sensors whose signals are provided to a temperature control apparatus, not shown, which varies the power delivered to cartridge heaters 90.

In one embodiment, a plurality of temperature sensors 92 are each arranged on a centerline drawn between pairs of adjacent cartridge heaters 90. A temperature control circuit, not shown, uses the output of a sensor 92 to control the operation of the two nearest cartridge heaters 90, with all of the temperature sensors being monitored to control the cartridge heaters to hold the temperature uniformly across platens 62 and 66 and mold cavity portions 12 and 14 to hold the temperature to a set point selected, in one embodiment, to lie between 270 and 320 degrees Fahrenheit and to hold that selected temperature within a range of between 5 and 10 degrees Fahrenheit across the mold surfaces on both halves of the mold. The combination of multiple cartridge heaters controlled by multiple closely spaced sensors and the thermal mass of the mold cavities 12 and 14 and platens 62 and 66 provides the thermal control and stability that are required for the molding of fluid flow plates for fuel cell assemblies.

Figure 10:
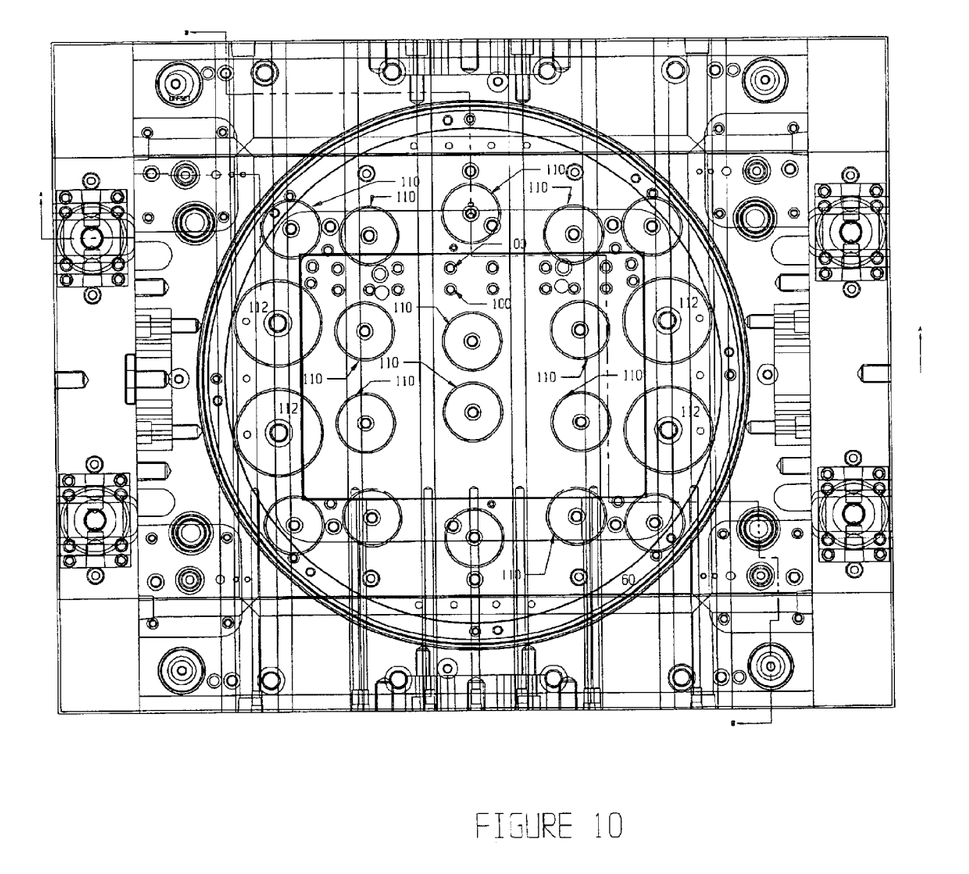
FIG. 10 is a sectional elevation view of the mold assembly illustrating the positioning of the cylindrical support columns, the distribution of the ejection pins and the distribution of the support columns.

FIGS. 8, 9 and 10 illustrate generally details relating to the ejector pin aspects of one embodiment of the mold assembly. At the top and bottom of the mold assembly are clamp plates 96 and 98. Adjacent to the four corners of the upper and lower portions of the assembly are actuators 94 which drive a lower ejector plate 102 and an upper ejector plate 104. Each of the ejector plates 102 and 104 carries a plurality of vertically upstanding ejector pins 100 which have the distal ends thereof disposed for engaging the molded part or fluid flow plate 30 at the ejection points 106 indicated on mold cavity portions 14 and 16 as shown in FIGS. 1 and 2.

In order to minimize the potential for damage to plate 30 by its ejection from the mold cavity portions 14 and 16, the majority of the ejection points 106 are positioned within the removable diaphragm areas 26 or in the distal corners of fluid flow plate 30, removed as much as possible from the intricate structure of the fluid flow paths in the active area 108 of fluid flow plate 30. By providing multiple ejection points within regions 26, sufficient release force can be brought to bear on part 30 to release it as the mold portions 14 and 16 are opened, even though the diaphragm portions are joined to the rest of the fluid flow plate 30 by extremely thin webs 46 which are intended to be readily broken to allow their removal from flow plate 30 prior to assembly of the fuel cell assembly. Providing ejector pins 100 which bear on both faces of molded plate 30 as the mold cavity opened assures a smooth, rapid release of plate 30 from the mold assembly.

FIGS. 8, 9, and 10 also illustrate other aspects of the mold assembly 10. FIG. 10 is a top sectional view of mold assembly 10 which illustrates the distribution of support columns 110 which provide mechanical strengthening of mold cavity portions 14 and 16 within mold assembly 10. At the center of mold the mold cavity where the active area 108 of the flow plate 30 is molded, there are six support columns 110 which provide needed support to the portion of the cavities molding the active area. The necessary room for providing the concentration of support columns 110 in the region of the mold assembly 10 where the active area 108 is molded is due in part to the fact that that area does not include ejector pins 100 which are positioned at other regions throughout the cavity area with support columns 110. Relatively thicker support columns 112 are provided in the outer portion of the mold cavity.

In FIG. 8 it can be seen that platens 62 and 64 have side locks 112 which provide for positive and aligned closing of mold assembly 10.

In order to carry out a molding operation using the mold assembly 10 according to the present invention it is first necessary to take the fine graphite and resin mixture and prepare it into a mold preform prior to moving the material to the mold cavity. According to one embodiment of the invention the material is placed in a separate press to form a generally cylindrical preform having a diameter of about approximately 3 inches. In one embodiment the mixture is approximately about 75% graphite and the remainder is comprised substantially of thermosetting resins. In one embodiment the preform is compacted at a pressure of at least about 400 psi to form the preform which is, in one embodiment, about 3 inches thick. In one embodiment plate 30 is about approximately 10 inches by 12 inches and about ¼ inch thick at its thickest point. The preform is placed on one of the cavity mold portions 12 or 14 at a point as close as possible to the geometrical center of the cavity. The mold cavity portions are preheated to a predetermined temperature between 270 and 320 degrees Fahrenheit.

The press is then operated to close the mold portions 12 and 14 rapidly together as a vacuum is drawn on the vacuum manifolds 82 and 84. The closing time for the mold must be bring the pressure up to the full 300 tons of molding pressure in a period between about 0.5 and 3.0 seconds while the temperature of the mold is maintained. If the mold is not closed quickly enough, the resin graphite mixture may start to cure before the material has flowed to all areas of the mold cavity. If the mold is closed too quickly, the material is not sufficiently fluid to freely flow to all areas of the mold, even with vacuum assistance. In order to perform the molding process, the closing time of the mold assembly must be shortened substantially below the times that are practiced in conventional compression molding applications. In one embodiment where the molding is done using a 300 ton press, the addition of accumulators to allow for a more rapid build up of compression force may be necessary.

In another embodiment of the invention, the preform may not be subjected to a compression process. In that embodiment, the molding material of graphite and resin is run through a plasticizer heating process to produce a suitable preform for introduction into the molding cavity and molding according to the same process.

It is an important part of the process to consolidate the powdered molding material into a preform having an area which covers only a fraction of the area of the mold cavity. Our experience in molding with preforms which covered substantially the entire area of the surface of the mold cavity resulted in a high rejection rate because of poor material flow in the mold and a failure to reliably achieve uniform porosity product. Using the limited area preform in the center of the mold has surprisingly led to the molding of more uniform product despite the fact that the material is required to move further within the cavity during the mold closing process step.

CONCLUSION

Systems, devices, structures, and methods have been described to address situations the molding of resins with high graphite filler content to form fluid flow palates for use in fuel cell assemblies. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A mold assembly comprising:
   a first platen and mold cavity portion;
   a second platen and mold cavity portion, the first and second mold cavity portions constructed and arranged for receiving in a mold cavity thereof;
   a preform billet comprising a thermosetting resin and at least about 50% by weight of a graphite filler material, the preform billet having a cross-sectional area in the plane of the mold cavity portions which is only a fraction of the area of the mold cavity portions;
   a press for performing a molding operation, wherein the press is capable of forcing the first and second platen and mold cavity portions together in an interfitting relationship, thereby compressing and flowing the preform billet into a molded plate with features therein defined by the first and second cavity portions; and
   wherein the molded plate includes at least one diaphragm area having a thinner web of molded material therein which is readily removable from the molded plate when it is put in use.

2. The mold assembly of claim 1 wherein the first and second platens each also comprise a plurality of heating elements embedded therein, the heating elements constructed and arranged for maintaining a selected elevated temperature of the first and second cavity portions during the molding operation.

3. The mold assembly of claim 2 wherein temperature sensors are embedded in the first and second platens adjacent to at least one of the of the heating elements for providing a measurement of the platen temperature to temperature control circuitry driving heating elements adjacent to the temperature sensors.

4. The mold assembly of claim 3 wherein each temperature sensor is positioned adjacent at least one heating element and temperature control circuitry associated with it controls the temperature of those heating elements.

5. The mold assembly of claim 3 wherein the selected elevated temperature lies in a range between about 270 and 320 degrees Fahrenheit.

6. The mold assembly of claim 5 wherein the selected elevated temperature is maintained to within 5 to 10 degrees Fahrenheit across the molded part throughout the molding operation.

7. The mold assembly of claim 1 wherein the press opens the mold cavity by separating the mold cavity portions and at least one of the first and second cavity portions also comprises ejection devices positioned at various locations across the surface of the molded part, the ejection devices constructed and arranged for actuation during the opening of the cavity defined by the first and second cavity portions.

8. The mold assembly of claim 7 wherein both of the first and second cavity portions comprise ejection devices.

9. The mold assembly of claim 7 wherein the ejection devices comprise a plurality of ejector pins mounted on a separate ejector plate for movement relative to a cavity portion during actuation to apply an ejection force to the molded part as the mold cavity opens.

10. The mold assembly of claim 1 wherein both of the first and second cavity portions also comprise ejection devices at various locations across the surface of the diaphragm areas of the molded plate, the ejection devices constructed and arranged for actuation during the opening of the mold cavity.

11. The mold assembly of claim 10 wherein the first and second platen and mold cavity portions also comprise interfitting vacuum seals and the press also includes vacuum manifolds communicating to the mold cavity for establishing a partial vacuum between the first and second mold cavities during the molding operation.

12. The mold assembly of claim 11 wherein the partial vacuum is established in the mold cavity before the mold cavity portions are fully closed.

13. The mold assembly of claim 1 wherein the first and second cavity portions are formed from tool steel coated with a polyfluorotetraethylene material.

14. The mold assembly of claim 1 wherein outside edges of the first and second cavity portions when the mold cavity is fully closed are constructed and arranged for providing a parting line gap of about approximately 0.007 inches remains open around the perimeter of the part upon completion of the molding operation.

15. The mold assembly of claim 14 wherein the first and second cavity portions have a projecting land portion around substantially their entire circumference at the parting line, the land potions each being parallel to each other and the face of the molded part and separated from each other by about approximately 0.007 inches when the first and second cavity portions are in a closed position.

16. The mold assembly of claim 1 wherein the press is capable of applying a molding pressure of at least about 300 tons within about 0.5 to 3 seconds as the molding operation is performed.

17. A mold assembly comprising:
   a first platen and mold cavity portion;
   a second platen and mold cavity portion, the first and second mold cavity portions constructed and arranged for receiving in a mold cavity thereof;
   a preform billet comprising a thermosetting resin and at least about 50% by weight of a graphite filler material, the billet having a limited cross-sectional area in the plane of a surfaces of the mold cavity portions relative to the area of the surfaces of the mold cavity portions;
   the first and second mold cavity portions constructed and arranged for performing a molding operation, wherein the press is capable of forcing the first and second platen and mold cavity portions together in an interfitting relationship and compressing the preform billet into a molded part with features therein defined by the first and second cavity portions.

18. The mold assembly of claim 17 wherein the first and second platens each also comprise a plurality of heating elements-embedded therein constructed and arranged for maintaining a selected elevated temperature of the first and second cavity portions during the molding operation.

19. The mold assembly of claim 18 wherein the selected elevated temperature lies in a range between about 270 and 320 degrees Fahrenheit.

20. The mold assembly of claim 17 wherein the selected elevated temperature is maintained to within 5 to 10 degrees Fahrenheit across the molded part throughout the molding operation.

21. The mold assembly of claim 17 wherein the mold cavity portions are separable to open the mold and at least one of the first and second cavity portions also comprises ejection devices positioned at various locations across the surface of the molded part, the ejection devices constructed and arranged for actuation during the opening of the cavity defined by the first and second cavity portions.

22. The mold assembly of claim 21 wherein both of the first and second cavity portions comprise ejection devices.

23. The mold assembly of claim 21 wherein the ejection devices comprise a plurality of ejector pins mounted on a separate ejector plate for movement relative to a cavity portion during actuation to apply an ejection force to the molded part as the mold cavity opens.

24. The mold assembly of claim 17 wherein the molded part includes at least one diaphragm area having a thinner web of molded material therein which is readily removable from the molded part when it is put in use and wherein both of the first and second cavity portions also comprise ejection devices at various locations across the surface of the diaphragm areas of the molded part, the ejection devices constructed and arranged for actuation during the opening of the mold cavity.

25. The mold assembly of claim 17 wherein vacuum providing means are provided for establishing a partial vacuum between the first and second mold cavities during the molding operation.

26. The mold assembly of claim 17 wherein the first and second cavity portions are formed from tool steel coated with a polyfluorotetraethylene material.

27. The mold assembly of claim 17 wherein outside edges of the first and second cavity portions when the mold cavity is fully closed are constructed and arranged for providing a parting line gap of about approximately 0.007 inches remains open around the perimeter of the part upon completion of the molding operation.

28. The mold assembly of claim 27 wherein the first and second cavity portions have a projecting land portion around substantially their entire circumference at the parting line, the land potions each being parallel to each other and the face of the molded part and separated from each other by about approximately 0.007 inches when the first and second cavity portions are in a closed position.

29. The mold assembly of claim 1 wherein the preform billet is generally cylindrical with its axis substantially perpendicular to the surface of the at least one of the first and second mold cavity portions.

30. The mold assembly of claim 29 wherein the preform billet has a diameter of about approximately 3 inches.

31. The mold assembly of claim 30 wherein the molded plate is about approximately 10 inches by 12 inches.

32. The mold assembly of claim 17 wherein the shape of the preform billet is generally cylindrical with its axis substantially perpendicular to the surface of the at least one of the first and second mold cavity portions.

33. The mold assembly of claim 32 wherein the preform billet has a diameter of about approximately 3 inches.

* * * * *

UNITED STATES PATENT AND TRADEMARK OFFICE
CERTIFICATE OF CORRECTION

PATENT NO. : 6,854,964 B1
DATED : February 15, 2005
INVENTOR(S) : Benkofske et al.

It is certified that error appears in the above-identified patent and that said Letters Patent is hereby corrected as shown below:

Column 8,
Line 53, delete "claim 10" and insert -- claim 1 --, therefor.

Column 9,
Line 35, delete "elements-embedded" and insert -- elements embedded --, therefor.

Signed and Sealed this

Twenty-fourth Day of May, 2005

JON W. DUDAS
*Director of the United States Patent and Trademark Office*